(12) United States Patent
Merrick

(10) Patent No.: US 6,483,526 B1
(45) Date of Patent: Nov. 19, 2002

(54) MULTI-LAYER ENTRY FIELDS

(75) Inventor: Roland Albert Merrick, Nr Evesham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/379,860

(22) Filed: Aug. 24, 1999

(30) Foreign Application Priority Data

Sep. 24, 1998 (GB) .............................................. 9820714

(51) Int. Cl.$^7$ ................................................. G09G 5/00

(52) U.S. Cl. ........................ 345/780; 345/709; 345/714; 345/768

(58) Field of Search ................................ 345/780, 705, 345/714, 709, 768, 808

(56) References Cited

U.S. PATENT DOCUMENTS

| | | | | |
|---|---|---|---|---|
| 5,602,982 A | * | 2/1997 | Judd et al. .................. | 345/709 |
| 5,651,107 A | * | 7/1997 | Frank et al. ................ | 345/768 |
| 5,721,853 A | | 2/1998 | Smith ......................... | 395/353 |
| 5,805,164 A | * | 9/1998 | Blum et al. ................. | 345/808 |
| 6,020,886 A | * | 2/2000 | Jacober et al. ............. | 345/709 |

* cited by examiner

*Primary Examiner*—John Cabeca
*Assistant Examiner*—Kieu D. Vu
(74) *Attorney, Agent, or Firm*—Louis J. Percello; Ronald L. Drumheller

(57) ABSTRACT

A multi-layer entry field is disclosed comprising a number of layers including a base plane, a field prompt layer, a Help Prompt layer, a layer displaying the data entered, and an error message layer. The layers are displayed superimposed on one another to reduce the screen area required to display the entry-field and its associated information, making the invention especially useful for Palmtop computers.

7 Claims, 2 Drawing Sheets

Roland A. Mer
Error: Last name is incomplete.
Enter your name here : First name, Midd

FIG.1

MULTI-LAYER ENTRY FIELDS

FIELD OF THE INVENTION

The present invention relates to a multi-layer entry field component.

BACKGROUND OF THE INVENTION

In general terms, entry fields expose methods which allow their properties to be queried, set and modified, for example, getText, setText. Entry fields may also have a default text prompting a user to input text in the correct format. Entry fields also generate events, for example, keypressed or textValueCompleted.

In commercial applications, entry fields are usually surrounded by other text, placing the entry field in context within an application. Thus, the name of the entry field may need to be placed beside the field when displayed on a screen. This helps to distinguish fields which may have similar contents, for example, phone number and fax number or positions associated with names such as Manager, Director etc. It is also common for applications to provide hover help with any screen controls. Thus, if a user places a mouse pointer over a control for longer than a pre-determined time, a piece of explanatory text appears beside the field. Also, if a user enters text incorrectly, then an error message may need to be displayed beside the entry field or on an application status bar, prompting the user to correct their entry.

All of this information requires screen space to be allocated to an entry field. This is not normally a problem for standard desktop or even laptop computers, but with the advent of small screen palmtop computers, screen "real estate" is at a premium, and for one control's associated text to occlude anothers may be very confusing for a user.

Another problem is the contrasting style of platform supplied controls with the style adopted by web sites trying to project a brand image. Whilst sites have been able to create "buttons" and "menus" which exhibit the required style, so far entry fields have not.

The present invention operates by adapting an entry field to allow for additional properties, extend the standard behaviour in response to events and implement support for additional events.

DISCLOSURE OF THE INVENTION

Accordingly, the present invention provides a multi-layer entry field component for a graphic user interface, said component being instantiable to occupy an area of a screen display and having: a characteristic adapted to store text entered by the user; a characteristic adapted to store pre-set help text; a characteristic adapted to store a pre-set condition for determining when said help text is displayed; a characteristic adapted to store a pre-set prompt text; and means adapted to display said user entered text, said pre-set prompt text and said help text within said screen area.

BRIEF DESCRIPTION OF THE DRAWINGS

An embodiment of the invention will now be described with reference to the accompanying drawings, in which:

FIG. 1 shows a multi-layer entry field according to the invention; and

DESCRIPTION OF THE PREFERRED EMBODIMENTS

Figure 2:
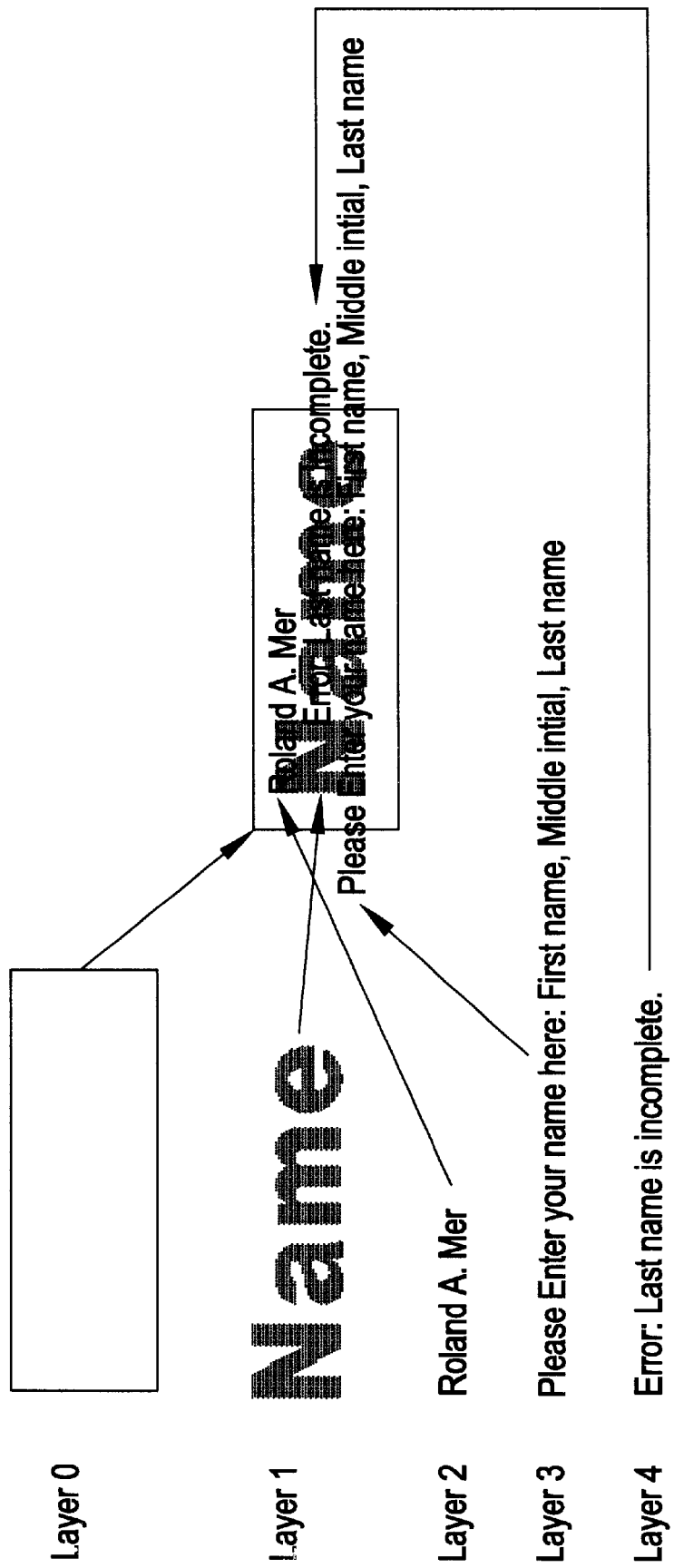
FIG. 2 shows the individual layers of the entry field of FIG. 1.

FIG. 1 shows an instantiation of an entry field according to the invention. The entry field comprises of a number of planes or layers, each with a distinct purpose and a set of properties to control it:

1. The base plane (Layer 0 in FIG. 2) can be transparent, translucent, an image or a plain colour. In the example shown the base plane is a Color object (255, 255, 255) representing white. The black frame is shown for the purposes of the present description only to outline the object.

The entry field class exposes a method setBasePlane which takes a variety of parameter types, including a Color object or an Image object.

2. The second layer is the field prompt. In the example shown the field prompt is Name.

Thus, the entry field exposes setFieldPrompt, a method which takes a String or Rich Text string (including font (Arial Black), size (72) and color (128, 128, 128) grey) as a parameter which is painted onto the base plane. When implementing the invention in Java as either a class or in Java bean form, conventional paint classes can be used, whereas for other languages corresponding techniques need to be employed.

3. The third layer is the Help Prompt which is analogous in function to "hover-help" on conventional controls. This is normally a scrolling stream of text larger than the space available to the entry field. In the example shown, the help prompt is "Please enter your name here, First name, Middle Initial, Last name", which as can be seen from FIG. 2 is approximately 50% longer than the entry field.

Again, a method setHelpPrompt takes a Rich Text string (including font, size and colour) which is played through the entry field. setHelpPrompt also takes an origin for the scrolling text as a relative Dimension (x, y) from the lower left of play area. It also takes an indication of when the Help prompt will play, for example, when the entry field gains Focus, when the entry field receives a PlayHelpPrompt event or a continuous loop; and correspondingly when to stop the help prompt: when the entry field loses Focus, or when the entry field receives a StopHelpPrompt event.

4. The fourth layer is the data entered. In the example the data is "Roland A. Merl". This is the same as for a conventional text entry field and can be initialised with a string value.

5. The fifth layer, when used, is for error messages. This is normally a scrolling stream of text larger than the space available. In the example shown the field prompt is "Error: Last name is incomplete."

Again, setErrorMessage is a method which takes a Rich Text string (including font, size and colour) which is played through the entry field. Again, it also takes an origin for the scrolling text as a relative Dimension (x, y) from lower left of play area. The message is played when the entry field receives a PlayErrorMessage event and loops until the entry field receives a StopErrorMessage event.

Scrolling for both the third and fifth layers is simply a matter of iteratively repainting the supplied text and for each iteration moving the text incrementally to the left (or right). If the display is moving to the left, then when the right-hand end of the text disappears from view within the entry field, the origin is set to the right-hand end of the entry field. Using this technique, the text disappears completely from the left of the entry field before reappearing on the right. Alternatively, the scrolling can wrap around by detecting when the right-hand end of the text appears inside the right hand edge of the entry field, and then displaying the beginning of the text on the right and incrementally less of the end of the text from the left hand side of the entry field.

The entry field control according to the preferred embodiment responds to all the usual text entry field events plus 4 new ones intended to control the animation of the HelpPrompt and the ErrorMessage:=ps 1. PlayHelpPrompt is an event which causes the HelpPrompt to start scrolling.
2. StopHelpPrompt is an event which causes the HelpPrompt to stop scrolling.
3. PlayErrorMessage is an event which causes the ErrorMessage to start scrolling.
4. StopErrorMessage is an event which causes the ErrorMessage to stop scrolling.

In the present embodiment, the term events is used for method calls issued by the entry field to listeners which the entry field knows implement such methods. Similarly, the four extra events above are methods implemented by the entry field responsive to calls either by the entry field itself or external application components.

In the description above, for simplicity we have referred to the operation an entry field component. It will be seen, however, that it is run-time instantiations of the entry field component according to the invention that carry out the operations described above.

The invention is independent of any programming language, but it will be seen that because of its usefulness to palmtop computers and the ease of converting existing applications currently using conventional entry fields, the invention is easiest to implement using either java or activex.

What is claimed is:

1. A multi-layer entry field component for a graphic user interface, comprising:

an entry field on a screen display for display of text being entered by the user;

means for storing pre-set help text relating to the entry field and for displaying the help text within and only within said entry field and at the same time that said user entered text is being entered into said entry field;

means for storing a pre-set condition for determining when said help text is displayed; and means for storing a pre-set prompt text relating to the entry field and for displaying the pre-set prompt text within and only within said entry field and at the same time that said user entered text is being entered into said entry field;

at least two of said user entered text, said pre-set prompt text and said help text being superimposed over each other within said entry field.

2. An entry field component as claimed in claim 1 wherein said user entered text is superimposed over said pre-set prompt text.

3. An entry field component as claimed in claim 1 and further comprising means for storing a base plane object and for displaying said user entered text, said pre-set prompt text and said help text superimposed over said base plane object.

4. An entry field component as claimed in claim 1 and further comprising means for storing an error message text and for displaying said error message text within and only within said entry field.

5. An entry field component as claimed in claim 4 wherein said means for storing and displaying said error message text is responsive to an error condition to scroll said error message text through said entry field.

6. An entry field component as claimed in claim 1 wherein said means for storing and displaying the help text is responsive to said pre-set condition to scroll said help text through said entry field.

7. A computer program product comprising computer program code stored on a computer readable storage medium for, when executed on a computer, operating within a graphic user interface, the product comprising an entry field as claimed in claim 1.

* * * * *